United States Patent [19]

Beck et al.

[11] Patent Number: 5,292,542
[45] Date of Patent: Mar. 8, 1994

[54] PROCESS FOR MAKING DEHYDRATED POTATO PRODUCTS

[75] Inventors: Roderick G. Beck; Clayton D. Pratt; Pamela R. Bartausky, all of Blackfoot, Id.

[73] Assignee: Services Alimentaires, S.A.,

[21] Appl. No.: 901,533

[22] Filed: Jun. 19, 1992

[51] Int. Cl.$^5$ .......................................... A23L 1/2165
[52] U.S. Cl. .................... 426/285; 426/444; 426/453; 426/457; 426/464; 426/637
[58] Field of Search ............... 426/272, 285, 637, 444, 426/454, 456, 464, 457, 453

[56] References Cited

U.S. PATENT DOCUMENTS

| | | |
|---|---|---|
| 3,031,314 | 4/1962 | Hendel et al. ........................ 426/464 |
| 3,407,080 | 10/1968 | Rainwater et al. . |
| 3,457,088 | 7/1969 | Beck . |
| 3,458,325 | 7/1969 | Beck . |
| 3,459,141 | 8/1969 | Keil . |
| 3,605,647 | 9/1971 | Beck et al. . |
| 3,622,355 | 11/1971 | Beck et al. . |
| 3,634,105 | 1/1972 | Beck et al. . |
| 3,764,345 | 10/1973 | Beck et al. . |
| 3,782,969 | 1/1974 | Beck et al. . |
| 3,789,750 | 2/1974 | Beck et al. ............................ 99/536 |
| 3,855,913 | 12/1974 | Harmon et al. ....................... 99/487 |
| 3,968,265 | 7/1976 | Shatila et al. ........................ 426/550 |
| 3,975,549 | 8/1976 | Shatila et al. ........................ 426/550 |
| 4,110,478 | 8/1978 | Ooraikul ......................... 426/444 X |

FOREIGN PATENT DOCUMENTS

| | | | |
|---|---|---|---|
| 730339 | 4/1980 | U.S.S.R. .............................. 426/637 |
| 8202652 | 8/1982 | World Int. Prop. O. .......... 426/637 |

*Primary Examiner*—Arthur L. Corbin
*Attorney, Agent, or Firm*—Pretty, Schroeder, Brueggemann & Clark

[57] ABSTRACT

A process for making dehydrated potato products from potato flakes so that they can be sulfite-free by mixing the potato flakes with a sufficient amount of water to increase their moisture content to a predetermined level, lowering the temperature of the moistened potato flakes to a temperature and for a period of time sufficient for retrogradation of free soluble starch contained in the potato flakes, reducing the size of the potato flakes in a manner to minimize breakage of potato cell walls, and drying the resulting potato product. The dehydrated potato product can be reconstituted without using a boiling liquid to make a dough for french fries or to make a mashed potato product.

29 Claims, No Drawings

PROCESS FOR MAKING DEHYDRATED POTATO PRODUCTS

BACKGROUND OF THE INVENTION

1. Field of the Invention

The present invention relates to a process for making dehydrated potato products from potato flakes that can be reconstituted to make a dough for french fries, or to make mashed potatoes, without using a boiling liquid.

2. Description of Related Art

In general, two types of dehydrated potato products have been used to make instant french fries or instant mashed potatoes by reconstitution in liquid. These are potato granules and potato flakes, both of which absorb water readily and are produced commercially in large amounts. Because the processes by which these products are made are quite different, their properties tend to be quite different, whether they are made from freshly harvested potatoes, or from potatoes that have been in storage for many months. As a rule, potato flakes tend to have a lower density, are reconstituted in cold or warm liquid, and cannot tolerate boiling liquid reconstitution or whipping. Potato granules, on the other hand, tend to have a higher density, must be reconstituted in boiling liquid rather than in cold or warm liquid, and can withstand whipping without creating poor texture or pastiness. Thus, whether potato granules or potato flakes are preferred for a particular application depends upon the specific circumstances and the environment in which they will be used.

One of the major differences between the processes for making flake and granules is the absence of a starch retrogradation step in the flake process. Starch retrogradation is required in the granule process to attain proper granulation. However, starch retrogradation also tends to cause the granules not to rehydrate fully in cold water. Another significant difference between these two processes is that sulfites must be added during the processing of potato granules, but do not have to be added during the processing of potato flakes. This is important in those countries, like Japan, that do not want to buy food products that have sulfites in them.

Because potato flakes advantageously can be reconstituted in cold water, but their density is too low to be economical for many applications, many processes have attempted to increase the bulk density of potato flakes. Unfortunately, the result prior to the present invention has been the loss of some of the desirable characteristics of the potato flakes. For example, reducing the size of dry potato flakes until their density is comparable to that of potato granules causes the potato cell walls to rupture, leading to the release of large quantities of free starch. This causes pastiness in the reconstituted mash, even with the use of improvers. Processing the broken flakes for retrogradation of the free starch changes the flavor of the reconstituted mash and, as noted above, alters their rehydration characteristics by reducing their water uptake and their ability to reconstitute in cold liquid.

Accordingly, the need exists for a dehydrated potato product which is made from potato flakes so that it can be sulfite-free, and which can be reconstituted to make a dough for french fries or to make mashed potatoes without using a boiling liquid.

SUMMARY OF THE INVENTION

The present invention provides a process for making dehydrated potato products from potato flakes comprising mixing potato flakes with a sufficient amount of water to increase their moisture content to a predetermined level, lowering the temperature of the moistened potato flakes to a temperature and for a period of time sufficient for retrogradation of free soluble starch in the potato flakes, reducing the size of the potato flakes in a manner to minimize breakage of potato cell walls, and drying the resulting potato product to form a dehydrated potato product that can be reconstituted to make a dough for french fries or to make mashed potatoes without using a boiling liquid. The temperature of the moistened potato flakes is preferably lowered below 45° F. to accelerate starch retrogradation and, in particular, to a temperature between about 23° to about 35° F. When the temperature is lowered below freezing, the process additionally comprises the step of increasing the temperature of the potato flakes a sufficient amount to melt ice crystals formed from the freezing temperature before the step of reducing the size of the potato flakes.

The amount of water mixed with the potato flakes should be enough to increase their moisture content to between about 30% to about 55% by weight moisture and, preferably, to between about 40% to about 50% by weight to make a dough for french fries, and between about 35% to about 45% by weight to make mashed potatoes. The temperature of the water mixed with the potato flakes is preferably between about 35° to about 70° F. In a preferred embodiment, the temperature of the moistened potato flakes is lowered to a temperature between about 23° to about 35° F., and more preferably, between about 28° to about 30° F. That temperature is maintained for at least ten minutes, and preferably for one hour, to maximize retrogradation of substantially all of the free starch in the potato flakes. Thereafter, the temperature is preferably increased to a temperature between about 32° and 40° F. before the size of the moistened potato flakes is reduced. The dehydrated potato product is dried for a period of time sufficient to remove moisture contained therein until it has a moisture content preferably between about 6% to about 8% by weight. The process also preferably includes the step of passing the dehydrated potato product through a screen of desired dimensions for sizing, with the undesirable sizes being recycled through the process When the dehydrated potato product is to be reconstituted to make a dough for french fries, it is preferred to form discrete particles of substantially the same size and density by passing the potato product before drying through a forming means, such as a screen of desired dimensions. To provide the cohesive properties needed for shaping the dough into french fries, binders are preferably mixed with the moistened potato flakes during the step of reducing their size. Preferred binders include gums, such as guar gum and xanthum gum, egg white, starch, methocel, and mixtures thereof.

When the dehydrated potato product is to be reconstituted to make mashed potatoes, binders are not needed, nor is it important to have discrete particles of uniform size and density. Instead, flavorings are added during the process, and are preferably mixed with the moistened potato flakes during the step of reducing their size. Preferred flavorings include nonfat milk, whole milk, butter, cheese, sour cream, whey, oil, salt, pepper, spices, and mixtures thereof.

Other features and advantages of the present invention will become apparent from the following detailed description of the preferred embodiment, which illustrates by way of example the principles of the invention.

DETAILED DESCRIPTION OF THE PREFERRED EMBODIMENT

Any commercially available potato flakes can be used in the process of the present invention. Potato flakes have a particular advantage over potato granules in that they generally do not include sulfites or similar additives which are not acceptable by people in countries such as Japan. Potato flakes with sulfites, however, are not excluded from the process of the present invention and could be used if desired. Potato flakes are produced commercially in large volumes by several companies throughout the world. Potato flakes that are particularly suitable in the process of the present invention are made by Nonpareil Corporation in Blackfoot, Id.

The desired amount of potato flakes to be processed are placed in a suitably large container to which a sufficient amount of water is added to increase the moisture content of the potato flakes to a predetermined level. Because potato flakes can be rehydrated in cold water, the temperature of the water mixed with the potato flakes preferably is between about 35° to about 70° F. The potato flakes and water are blended together using any suitable means to mix them such as, e.g., stirring by hand or using a Hobart or similar mixer, until the desired moisture content has been reached.

The proper moisture content is important as it affects the shape of the dehydrated potato product formed by the process of the present invention. Preferably, the moisture content of the potato flakes should be from about 30% to about 55% by weight moisture. If the moisture content is below about 30% by weight, the potato flakes may be too fragile for processing, and small flakes may be formed by the process of the present invention. On the other hand, if the moisture content rises above about 55% by weight, the dehydrated potato product tends to include particles that are too large. A moisture content between from about 40% to about 50% by weight is particularly preferred for making a dough for french fries, while a moisture content between about 35% to about 45% by weight is particularly preferred for making mashed potatoes. A slightly higher moisture content is preferred when making a dough for french fries because the shapes of the particles comprising the dehydrated potato product tend to be of greater importance for making french fries than for making mashed potatoes.

After the desired moisture content has been reached, the temperature of the moistened potato flakes is lowered to a temperature and for a period of time sufficient for retrogradation of free soluble starch contained in the potato flakes. The temperature can be lowered quickly using means well known in the art, such as a carbon dioxide or liquid nitrogen freezer, or the temperature can be lowered more slowly by placing the moistened potato flakes in a temperature-controlled chamber, such as an Air Products or similar commercial freezer. Starch retrogradation proceeds more quickly when the temperature is lowered below about 45° F. This means that as the temperature decreases, the period of time that the moistened potato flakes need to be kept at that temperature for retrogradation of substantially all of the free starch also decreases. Temperatures as low as about 20° F. or as high as about 45° F. can be used satisfactorily in the process of the present invention. Lowering the temperature to between about 23° to about 35° F. is particularly suitable. To make a dehydrated potato product for mashed potatoes, the temperature is preferably lowered to between about 30° to about 40° F. To make a dehydrated potato product for french fries, the temperature is preferably lowered to between about 25° to about 32° F. In a preferred embodiment, the temperature of the moistened potato flakes is maintained at between about 28° to about 30° F. for at least ten minutes, and preferably for about one hour, to ensure retrogradation of substantially all of the free starch in the potato flakes. If some free starch remains in the potato flakes, the dehydrated potato product may be excessively sticky which would make it particularly unsuitable for making french fries. For that reason, the particular temperature and the period of time that temperature is maintained is more critical when making a dough for french fries than for making mashed potatoes.

When the temperature is lowered below freezing, ice crystals will form on the moistened potato flakes. These ice crystals must be removed before the step of reducing the size of the potato flakes as they will deleteriously affect the shape of the dehydrated potato product. On those occasions, the process additionally comprises the step of increasing the temperature above freezing for a period of time sufficient to melt the ice crystals formed by the freezing temperature. However, for improved processing during the step of reducing the size of the potato flakes, the temperature of the potato flakes is preferably kept below about 40° F., although higher temperatures may be used if desired.

After retrogradation of the starch, the size of the potato flake is reduced by using a mixer or granulating means well known to those of ordinary skill in the art. Importantly, the size is reduced in a manner to minimize breakage of potato cell walls to avoid releasing free starch which will cause the dehydrated potato product to be excessively sticky. It has been found that the size of the potato flakes can be satisfactorily reduced by mixing the potato flakes using a rolling motion, such as that imparted by a rotating blade in a Hobart mixer, for example, Model D 300-I by Hobart Corporation of Troy, Ohio. The potato flakes are mixed until they lose their identity as flakes. The actual length of time that the flakes are mixed does not appear to be critical and will vary depending upon the characteristics of the flakes themselves.

Preferably, binders or flavorings are added to the potato flakes while they are being mixed to reduce their size. When the dehydrated potato product is to be reconstituted to make a dough for french fries, a minor amount of binder is mixed with the potato flakes. Generally, the binder is added in an amount less than about 5% by weight as greater amounts do not appear to provide additional advantages and may impart an undesirable texture. The binder is preferably added during the step of reducing the size of the potato flakes to obtain proper distribution of the binder among the potato fakes, such as by coating them. The binder is essential to ensure a uniform cohesiveness when the dehydrated potato product is reconstituted to make a dough for french fries, and provides the properties necessary to shape the dough into the desired french fry forms. Preferred binders include gums, such as guar gum and xantham gum, egg white, starch, methocel, and mixtures thereof. In particular, a combination of egg white, guar gum, and starch has been found to provide particularly good results.

When the dehydrated potato product is to be reconstituted to make mashed potatoes, binders are not necessary Instead, it is preferred to add up to 8% by weight of flavorings to the potato flakes during the process, although the flavorings are preferably added during the step of reducing the size of the potato flakes. Preferred flavorings include nonfat milk, whole milk, butter, sour cream, cheese, whey, oil, pepper, salt, spices, and mixtures thereof. A mixture of nonfat milk, salt, and pepper is particularly preferred.

The dehydrated potato product produced by the process of the present invention can be used in an automatic machine for making french fries, such as that described in the copending, commonly owned patent application Ser. No. 583,806 filed on Sep. 17, 1990 now U.S. Pat. No. 5,197,376. For such applications, the dehydrated potato product preferably consists of discrete particles similar in size and density. This can be accomplished after the size of the potato flakes has been reduced by passing the resulting product through a forming means to form discrete particles having substantially the same size and density. Any suitable forming means can be used, such as a screen or similar means having identical openings, e.g. a Kasson sifter or a device similar to a cheese grater. To facilitate forming discrete particles of substantially the same size and density, the temperature of the potato product before passing through the forming means is preferably between about 32° to about 38° F. To make certain that dry particles are formed which will make a french fry dough without lumps, excessive pressure should not be used to force the potato product through the forming means. By "excessive" is meant any pressure above that which is necessary to form the discrete particles.

After the size of the potato flakes has been reduced, the resulting product must be dried for a period of time sufficient to remove a desired amount of the moisture contained therein. Preferably, the dehydrated potato product has a moisture content between about 6% to about 8% by weight moisture. The potato product can be dried in a fluidized air dryer having an air temperature on the order of 170° F. and an air circulation rate from about 150 to about 400 ft. per minute as is well known in the art. Under these conditions, a residence time in the dryer of less than about 20 minutes will generally lower the moisture content to about 6%-8% by weight. Typical dryers are well known in the art, such as those manufactured by APV Crepaco, Buhler, Carrier, Key Technology, Wolverine, and Witte. It will be appreciated, however, that the dehydrated potato product can be dried by many other available methods as well.

When the resulting dehydrated potato product is to be reconstituted to make a dough for french fries, it preferably is screened to remove oversized and undersized material which can then be recycled by adding them to the potato flakes at the same time the binder or flavorings are added. A KEK Centrifugal Sifter can be combined with a screen having openings of the desired size to sort the particles. Preferably, the particles of the dehydrated potato product will pass through a 10 mesh sieve but are retained on a 20 mesh sieve (United States Sieve Series), resulting in a bulk density of about 0.4 g/cc. A broader range of sizes may be useful for particular applications. Moreover, the particular particle sizes are not critical when the dehydrated potato product is reconstituted to make mashed potatoes.

The dehydrated potato product of the process of the present invention tends to have a rather unique appearance in that the resulting particles do not look like flakes or balls. The dehydrated potato product is extremely stable and has an indeterminate shelf life without the need for sulfites, antioxidants, or other preservatives.

The dehydrated potato product produced by the process of the present invention can be reconstituted to make a dough for french fries in the absence of or at least without significant agitation as it is rehydrated. The dehydrated potato product can be rapidly rehydrated merely by subjecting the mass to the desired amount of nonboiling liquid, such as by allowing the liquid to flow by gravity into and along at least one surface of the dehydrated potato product. A uniform, cohesive but not sticky dough is formed within a relatively short period of time, generally on the order of less than one minute. The dehydrated potato product can be rehydrated by adding water in an amount between about 1½ to about 2½ parts water per each part of dehydrated potato product. A homogeneous dough results that can be readily divided and formed into segments of desired dimensions for deep fat frying to make french fries without loss of piece integrity.

The dehydrated potato product of the present invention can also be rapidly rehydrated to make mashed potatoes merely by mixing with hot tap water in an amount between about 5 to about 6 parts water per each part of dehydrated potato product. Preferably, the dehydrated potato product is added to the desired amount of water, and no stirring is necessary. The resulting mashed potatoes have improved texture and taste.

In order to more fully and clearly describe the present invention so that those skilled in the art may better understand how to practice the present invention, the following examples are given. These are intended to illustrate the invention and should not be construed as limiting the invention disclosed and claimed herein in any manner.

EXAMPLE 1

Commercial quality dehydrated potato flakes to which citric acid and sodium acid pyrophosphate have been added to preserve color can be used to produce a dehydrated potato product that can be made into mashed potatoes simply by adding hot water. Significantly, the potato flakes used as starting ingredients contain no sulfites or antioxidants.

275 grams of Nonpareil potato flakes (spec 3170) are mixed with 150 ml of cold tap water having a water temperature of about 60° F. This mixture is placed in a freezer at 0° F. for approximately ½ hour. The mixture is then removed from the freezer and kept at room temperature for approximately ½ hour to melt any ice crystals formed from being in the freezer. Thereafter, the mixture is further mixed in a Hobart mixer for approximately 2 minutes at high speed until a coarse particle having a diameter of about ½ inch is formed. The coarse particles are then mixed at low speed with 10 grams of nonfat milk, 10 grams of salt, and 0.9 grams pepper for about 30 seconds, after which this product is dried to a moisture content of about 6%-8% moisture by weight.

Mashed potatoes were made from this dehydrated potato product by adding 1 part by weight of the dehydrated potato particles to about 5 to 5.5 parts by weight hot tap water at a water temperature of about 130°-170°

F. No stirring was necessary, and butter can be added to suit one's taste. The resulting product was judged excellent in appearance, flavor, and texture.

EXAMPLE 2

Commercial quality dehydrated potato flakes with citric acid and sodium acid pyrophosphate added to preserve color can also be used to make a dehydrated potato product that can be made into a french fry dough that can be cut or extruded into french fry shapes and deep fat fried. As in Example 1, the potato flakes used as starting materials contained no sulfites or antioxidants.

19.4 lbs. of Nonpareil potato flakes (spec 3170) are mixed with 10.6 lbs. of cold tap water having a water temperature of about 60° F. This mixture is then quick frozen to about 25° F. by using liquid nitrogen at −10° F. for approximately 4½ minutes, and the frozen mixture is kept at a temperature between 25° and 32° F. for about 1 hour. The mixture is then mixed for about 1 minute in a Hobart mixer at medium speed, after which 450 grams guar gum, 312 grams salt, 300 grams egg white, and 186 grams starch are added and then mixed for 20 seconds at low speed. While the mixture has a temperature between about 32°-38° F., it is forced through a forming means, such as a cheese grater, to form small discrete particles of substantially the same size and density. These discrete particles are then dried in a fluidized air dryer, after which they are screened to about a −10 to +20 mesh size to form a dehydrated potato product having particles of substantially the same size with a bulk density of about 0.4 grams per cc.

The dehydrated potato product formed a dough when mixed with 2 parts by weight of either cold or hot tap water having a temperature in the range of 50° to 180° F. for each part dehydrated potato product. The resulting dough can be formed into french fry strips by cutting, extruding and deep fat frying for about 1 minute in 350°-370° F. frying oil to produce french fried products of excellent shape, color and taste.

While preferred embodiments and applications of this invention have been shown and described, it will be apparent to those skilled in the art that many more modifications are possible without departing from the inventive concept described herein. The invention, therefore, is to be limited only by the lawful scope of the claims which follow.

What is claimed is:

1. A process for making a dehydrated potato product from potato flakes, comprising:
   mixing potato flakes with a sufficient amount of water to increase their moisture content to a predetermined level;
   lowering the temperature of the moistened potato flakes to a temperature and for a period of time sufficient for retrogradation of free soluble starch contained in the potato flakes;
   reducing the size of the potato flakes in a manner to minimize breakage of potato cell walls; and then
   drying the resulting potato product for a period of time sufficient to remove a desired amount of the moisture contained therein.

2. The process of claim 1 wherein the temperature is lowered below 45° F.

3. The process of claim 2, wherein when the temperature of the moistened potato flakes is lowered below freezing, before reducing the size of the potato flakes the process additionally comprises the step of increasing the temperature of the potato flakes a sufficient amount to melt ice crystals formed from lowering the temperature below freezing.

4. The process of claim 2 wherein the amount of water mixed with the potato flakes increases their moisture content to between about 30% to about 55% by weight moisture.

5. The process of claim 4 wherein the moisture content is increased to between about 40% to about 50% by weight moisture.

6. The process of claim 4 wherein the moisture content is increased to between about 35% to about 45% by weight moisture.

7. The process of claim 2 wherein the temperature of the water mixed with the potato flakes is between about 35° to about 70° F.

8. The process of claim 2 wherein the temperature of the moistened potato flakes is lowered to a temperature between about 23° to about 35° F.

9. The process of claim 8 wherein the temperature of the moistened potato flakes is maintained at between about 28° to about 30° F. for a period of time sufficient for retrogradation of substantially all of the free starch in the potato flakes.

10. The process of claim 9 wherein the lowered temperature of the moistened potato flakes is maintained for at least 10 minutes.

11. The process of claim 2 wherein the size of the potato flakes is reduced by mixing the potato flakes using a rolling motion.

12. The process of claim 2 additionally comprising the step of passing the potato flakes having a reduced size through a forming means to form discrete particles of substantially the same size and density.

13. The process of claim 2 wherein the step of reducing the size of the potato flakes includes the step of mixing the potato flakes with binders or flavorings.

14. The process of claim 13 wherein the binders are selected from the group consisting of guar gum, xantham gum, egg white, starch, methocel, and mixtures thereof.

15. The process of claim 13 wherein the flavorings are selected from the group consisting of nonfat milk, whole milk, butter, cheese, sour cream, whey, oil, salt, pepper, spices, and mixtures thereof.

16. The process of claim 2 additionally comprising the step of reconstituting the dried potato product to make a dough for french fries.

17. The process of claim 2 additionally comprising the step of reconstituting the dried potato product to make mashed potatoes.

18. The process of claim 1 additionally comprising the step of passing the dried potato product through a screen of desired dimensions for sizing.

19. A process for making a dehydrated potato product from potato flakes that can be reconstituted to make a dough for french fries, comprising:
   mixing potato flakes with a sufficient amount of water to increase their moisture content to between about 40% to about 50% moisture;
   lowering the temperature of the moistened potato flakes below 32° F. for at least about 10 minutes;
   thawing the potato flakes to a temperature sufficient to melt ice crystals formed from lowering the temperature below 32° F.;
   mixing the thawed potato flakes with at least one binder and reducing the size of the potato flakes in a manner to minimize breakage of potato cell walls; and then drying the resulting potato product to a moisture content of about 6% to about 8% by weight moisture.

20. The process of claim 19 additionally comprising the step of passing the resulting potato product through a means for forming discrete particles of substantially the same size and density.

21. The process of claim 20 wherein the temperature of the resulting potato product is between about 32° to about 38° F.

22. The process of claim 19 additionally comprising the step of passing the dried potato product through a screen to separate its particles by size.

23. The process of claim 19 wherein the potato flakes do not contain any sulfites.

24. The process of claim 19 wherein the binders are selected from the group consisting of guar gum, xantham gum, egg white, starch, methocel, and mixtures thereof.

25. The process of claim 19 wherein the binder comprises a mixture of guar gum, starch, and egg white.

26. A process for making a dehydrated potato product from potato flakes that can be reconstituted to make mashed potatoes, comprising:

mixing potato flakes with a sufficient amount of water to increase their moisture content to between about 35% to about 45% moisture;

lowering the temperature of the moistened potato flakes below 45° F. for at least about 10 minutes and, when the temperature is lowered below freezing, thawing the moistened potato flakes to a temperature sufficient to melt ice crystals formed from lowering the temperature below freezing;

mixing the thawed potato flakes with at least one flavoring;

reducing the size of the potato flakes in a manner to minimize breakage of potato cell walls; and then drying the resulting potato product to a moisture content of about 6% to about 8% by weight moisture.

27. The process of claim 26 additionally comprising the step of passing the dried potato product through a screen to separate its particles by size.

28. The process of claim 26 wherein the potato flakes do not contain any sulfites.

29. The process of claim 26 wherein the flavoring is selected from the group consisting of nonfat milk, whole milk, butter, cheese, sour cream, whey, oil, salt, pepper, spices, and mixtures thereof.

* * * * *